R. A. PITMAN.
LAND ROLLER.
APPLICATION FILED FEB. 12, 1917.
1,260,573.
Patented Mar. 26, 1918.
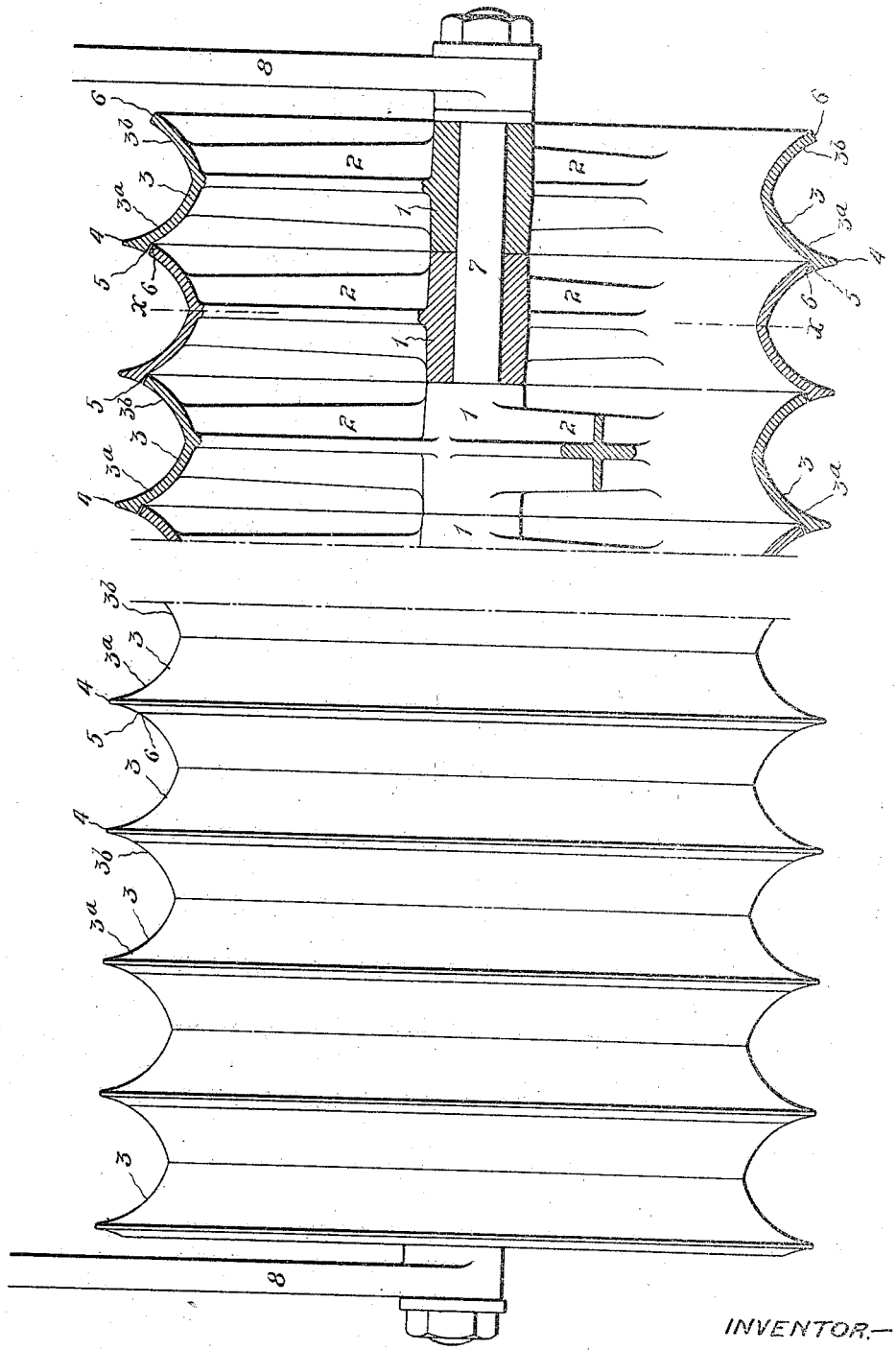
INVENTOR.—
ROBERT A. PITMAN,
BY HIS ATTORNEYS.—
Meskel and Saywell

UNITED STATES PATENT OFFICE.

ROBERT A. PITMAN, OF PHILADELPHIA, PENNSYLVANIA, ASSIGNOR TO THE DUNHAM COMPANY, OF BEREA, OHIO, A CORPORATION OF OHIO.

LAND-ROLLER.

1,260,573.

Specification of Letters Patent.

Patented Mar. 26, 1918.

Application filed February 12, 1917. Serial No. 148,142.

*To all whom it may concern:*

Be it known that I, ROBERT A. PITMAN, a citizen of the United States, and a resident of Philadelphia, Pennsylvania, have invented new and useful Improvements in Land-Rollers, of which the following is a specification.

My invention relates to land rollers designed to crush clods and substantially pulverize the surface of a plowed field, road, or the like, and one object of my invention is to provide an annular unit section whereby a roller structure of this character may be made in any length desired, from a plurality of said annular unit sections duplicated throughout the length of the roller; said unit sections being designed to mate with and supplement adjacent sections of the same size and shape, and when assembled providing the desired roller structure with a corrugated surface constituting the other object of my invention.

These and other features of my invention are more fully described hereinafter, reference being had to the accompanying drawing in which I have shown a view partly in elevation and partly in section of a land roller or pulverizer made up of the special unit sections in accordance with my invention.

My improved roller is of the type presenting an external corrugated contour having a plurality of annular ribs or projections substantially V-shape in cross-section. In rollers of this type made of separable sections, more or less difficulty has been experienced heretofore in constructing the same, especially where it may be desired to provide an integral or substantially integral unit. With a view of overcoming or obviating former difficulties of this character, I have devised a special form of annular member represented in the accompanying drawing, which may be cast as a single unit.

The improved annular unit section constituting one part of my invention and from a plurality of which the improved roller, constituting the other part of my invention, may be formed, comprises a wheel-like member having a suitable hub 1, with spokes 2 of any approved character; in the present instance I have shown them cruciform in cross section and three in number, and an annular rim flange 3, to which these spokes are connected, which rim flange is concave on its outer or ground-engaging surface. The concavity of the rim flange is relatively deep, and it may be of any desired contour.

The rim flange 3 is wider on one side than the other with respect to a plane $x$—$x$ passing through the middle of the hub 2; the wider side, indicated at 3ª, having the greatest diameter of the annular member and including the apex 4 of the tapered annular rib or projection provided by the respective unit sections. Additionally this side of the rim flange provides an annular shoulder 5, inwardly disposed with respect to the tapered portion 4. The opposite side 3ᵇ of the rim flange omits the tapered portion and is squared at 6 to lie adjacent and substantially in contact with the shoulder 5 of an adjoining member.

To construct a roller from these unit sections, it is only necessary to assemble the desired number upon a suitable shaft as 7, and connect said shaft to a suitable frame, of which side members 8 are indicated in the drawing. The fastening means securing shaft and frame together serve to maintain said annular unit sections substantially in contact with each other while permitting them to rotate independently of each other for the desired purpose.

My improved annular unit structure is an integral casting ready for assembly with others to form a roller or pulverizer as soon as removed from the mold and cooled. Such unit member may be of any desired size and proportions following the contour indicated, and may be cast in a permanent mold, or in any other suitable or convenient manner.

I claim:

1. As a new article of manufacture, a wheel-like unit section having a rim flange externally concaved, one side of said rim flange being wider than the other with respect to the median plane of the hub, said wider side having an inwardly disposed shoulder for engagement with the flange of an adjoining section.

2. As a new article of manufacture, a wheel-like unit section having a rim flange externally concaved and formed with a tapered rib, one side of said rim flange being wider than the other with respect to the median plane of the hub, said wider side having an inwardly disposed shoulder for engagement with the flange of an adjoining section.

3. As a new article of manufacture, a wheel-like unit section having a rim flange externally concaved, one side of said rim flange being wider than the other with respect to the median plane of the hub, said wider side having an outwardly tapered marginal portion forming an annular rib and an inwardly disposed shoulder directly adjacent said margin for engagement with the flange of an adjoining section.

4. As a new article of manufacture, an integral wheel-like unit section having an annular concaved flange and adapted, when assembled with other similarly shaped sections, to form a roller structure with annular ribs or projections, said ribs or projections being formed at one side of said concaved flange, the latter being inwardly shouldered for engagement by the flange of an adjacent section.

5. As a new article of manufacture, an integral unit section comprising a hub, an externally concaved flange, and spokes connecting said hub and flange; one side of said flange being wider than the other and having an inwardly disposed shouldered wall, the opposite side of the flange being shaped to abut a similar shoulder carried by an adjoining unit section.

6. As a new article of manufacture, an integral unit section comprising a hub, an externally concaved flange, and spokes connecting said hub and flange; one side of said flange being wider than the other and extending outwardly in a tapered portion forming an annular rib and having an inwardly disposed shouldered wall, the opposite side of the flange being reduced in diameter and squared to abut a similar shoulder carried by an adjoining unit section.

7. As a new article of manufacture, a wheel-like unit section having an annular rim flange; one side of the latter being wider than the other with respect to the median plane of the hubs; that side of such greater width being adapted to form in conjunction with the side of smaller width of an adjacent section, an outwardly projecting V-shaped rib.

8. A corrugated land-roller made up of a plurality of wheel-like unit sections rotatable independently of each other and forming a plurality of outwardly extending V-shaped ribs; every rib of the roller being formed by two adjacent and independently rotatable units.

9. A corrugated land roller made up of a plurality of wheel-like unit sections each having an externally concaved flange provided at one side with an annular rib or projection, said rib having an inwardly disposed shoulder in engagement with the opposite flange of an adjoining section.

ROBERT A. PITMAN.